(12) United States Patent
Inoue

(10) Patent No.: US 6,339,797 B1
(45) Date of Patent: Jan. 15, 2002

(54) INPUT/OUTPUT CLIENT SERVER SYSTEM FOR TRANSMITTING COMMANDS TO GENERAL PURPOSE INPUT/OUTPUT BY USING IP ADDRESS, INTERFACE ADDRESS, AND PHYSICAL PORT ADDRESS

(75) Inventor: Yoshikazu Inoue, Kitakyushu (JP)

(73) Assignee: Kyushu Electronics Systems, Inc., Fukuoka (JP)

( * ) Notice: Subject to any disclaimer, the term of this patent is extended or adjusted under 35 U.S.C. 154(b) by 0 days.

(21) Appl. No.: 09/221,813

(22) Filed: Dec. 29, 1998

(51) Int. Cl.[7] .......................... G06F 13/14; G06F 13/20
(52) U.S. Cl. .................. 710/3; 710/4; 710/8; 710/15; 710/19; 710/62
(58) Field of Search .............................. 710/3, 62, 4, 8, 710/15, 19

(56) References Cited

U.S. PATENT DOCUMENTS

| | | | | |
|---|---|---|---|---|
| 5,325,491 A | * | 6/1994 | Fasig | 395/325 |
| 5,872,998 A | * | 2/1999 | Chee | 395/876 |
| 6,123,241 A | * | 9/2000 | Walter et al. | 227/8 |
| 6,157,950 A | * | 12/2000 | Krishnan | 709/223 |

* cited by examiner

Primary Examiner—Thomas Lee
Assistant Examiner—Rehana Perveen
(74) Attorney, Agent, or Firm—Jordan and Hamburg LLP

(57) ABSTRACT

An input/output client/server system within a remote control system between general purpose apparatuses provided with TCP/IP compliant communications functions across networks comprising: single or plural general purpose input/output units mounted on the interface boards of remote input/output devices of a general purpose apparatus on the receiver side and provided with a function to give a predetermined response to a command transmitted thereto from a general purpose apparatus on the transmitter side; means for recognizing addresses of the general purpose input/output units provided on the general purpose apparatus on the receiver side; and means for transmitting a command to the general purpose input/output unit by using an IP address of the general purpose apparatus at the destination, an address of the respective interface connected to the respective general purpose input output unit, and the port address of the general purpose input/output unit connected to the general purpose apparatus on the transmitter side.

4 Claims, 2 Drawing Sheets

INPUT/OUTPUT CLIENT SERVER SYSTEM FOR TRANSMITTING COMMANDS TO GENERAL PURPOSE INPUT/OUTPUT BY USING IP ADDRESS, INTERFACE ADDRESS, AND PHYSICAL PORT ADDRESS

BACKGROUND OF THE INVENTION

The invention relates to an input/output client/server system, in which a general purpose apparatus provided with a function to communicate across networks complying with the TCP/IP protocol, such as a personal computer with Windows NTTM or Windows 95TM installed therein, can control, via the networks, general purpose input/output devices connected to a general purpose apparatus on the other end.

With the aim of enhancing productivity in a factory, for example, there have so far been architectured systems capable of exercising such management and control functions for machinery and equipment in the production line for the surveillance of operating conditions, collection of data concerning production results, analysis of output, and for controlling the machinery and equipment on each unit thereof. As an example, it is common to use a LAN (Local Area Network) in the production field by connecting microcomputers for controlling machines (for controlling input/output devices) to general purpose personal computers for production control.

In order to develop application software which enables access across the networks to input/output devices by use of general purpose personal computers, it was necessary to follow the procedure below in addition to making communications with microcomputers (for controlling input/output devices):

1. to develop client side software for transmitting input/output requests from the application software to the server side;

2. to develop server side software for receiving requests from the client side;

3. to develop server side software for accessing input/output devices;

4. to develop server side software for transmitting results of the access to the input/output devices to the client side; and 5. to develop client side software for receiving requests from the server side.

Incidentally, herein, the general purpose apparatus executing the application software will be called the client side and the general purpose apparatus having input/output devices connected thereto will be called the server side.

In the prior arts, it was possible to access input/output devices across networks by developing the above five sets of software. However, since these sets of software were dedicated, it was necessary to develop new software when there was a plurality of server sides.

Further, when there was a plurality of client sides, it was necessary for the server side to develop software capable of exclusive processing.

Furthermore, when a partial specification was changed, review or adjustment of the five sets of software became necessary, and this led to on increase in software development time and maintenance work and, above all, it increased costs.

SUMMARY OF THE INVENTION

An object of the invention is to provide an input/output client/server system in which the server side software need not be developed and changed to operate the input/output devices, and where the input/output devices on the server side can be controlled only by developing and changing software on the client side.

In order to solve this problem, there is provided an input/output client/server system in a remote control system between general purpose apparatuses provided with communications functions across networks complying with the TCP/IP protocol, comprising single or plural general purpose input/output units mounted on the interface boards of remote input/output devices of a general purpose apparatus on the receiver side and provided with a function to give a predetermined response to a command transmitted thereto from a general purpose apparatus on the transmitter side, means for recognizing addresses of the general purpose input/output units provided on the receiver side, and means for transmitting a command to the general purpose input/output unit with, attached thereto, the IP address of the general purpose apparatus at the destination and the port address of the general purpose input/output unit connected to the general purpose apparatus provided on transmitter side.

The network may be set up with a local area network or the Internet.

The power source of the general purpose apparatus on the receiver side and the power sources of the general purpose input/output units may be kept independent of one another, and the signal lines between the general purpose apparatus on the receiver side and the general purpose input/output units may be formed of floating-ground floating lines.

DESCRIPTION OF THE PREFERRED EMBODIMENTS

The invention provides an input/output client/server system using a technology to achieve access, in a network environment complying with the TCP/IP protocol, from a general purpose apparatus in the network to a port, a physical port, of general purpose input/output units connected to another general purpose apparatus in the network by means of an IP address as an address element for designating an input/output port when making input/output access across the network, as well as an application software developing environment in which the aforesaid system is used. The invention also provides a system, in which development of software is only required for the application side, enabling a general purpose apparatus to access a port of general purpose input/output devices connected to another general purpose apparatus anywhere in the world through the Internet by designating its IP address.

An embodiment of the invention will be concretely described with reference to the accompanying drawings.

Figure 1:
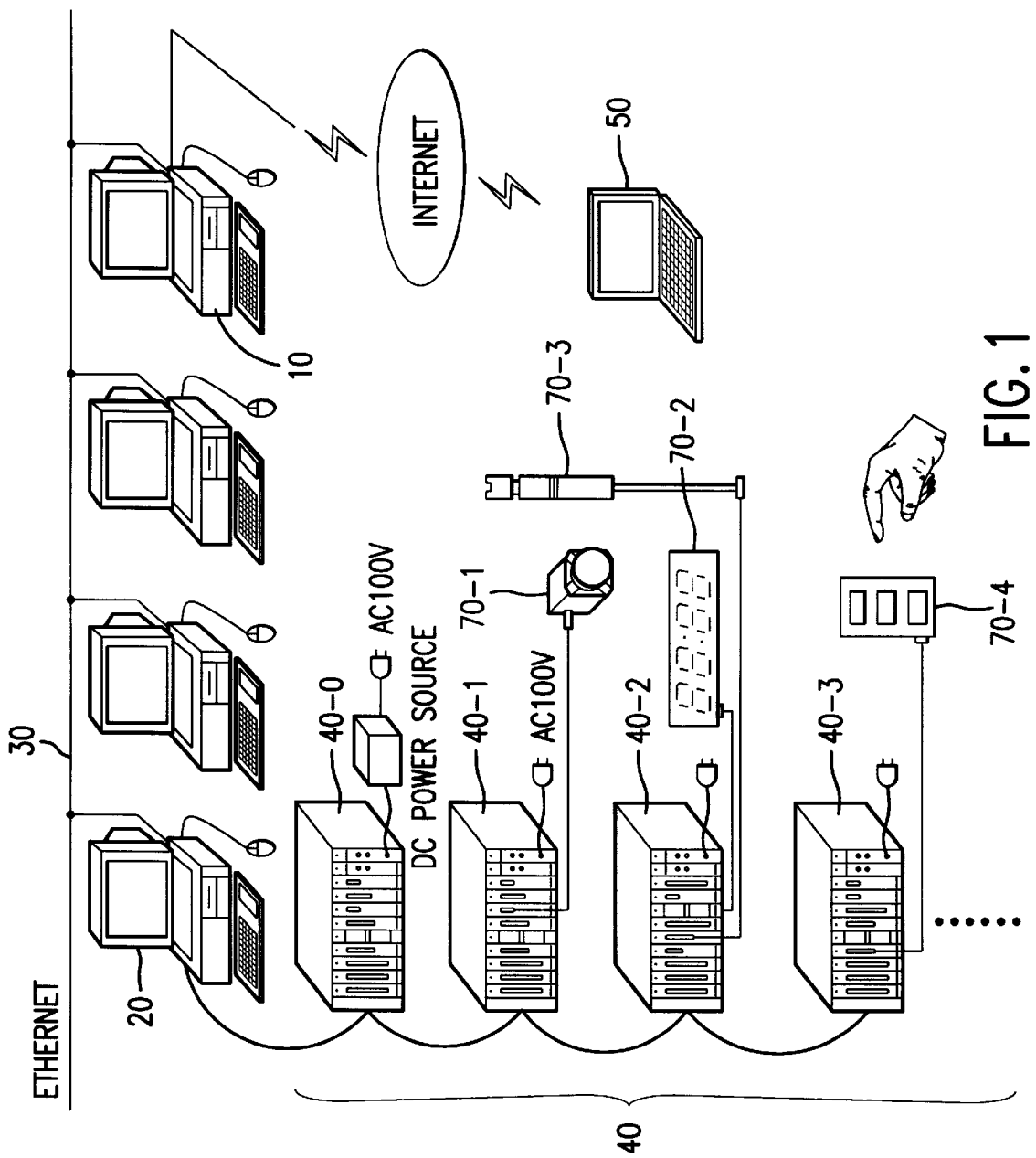
FIG. 1 is a block diagram showing the configuration of an embodiment of the invention.

FIG. 1 is a block diagram showing the configuration of an input/output client/server system of the invention.

Referring to FIG. 1, reference numeral 10 denotes a personal computer on the client side, 20 denotes a personal computer on the server side, 30 denotes an Ethernet cable, 40 denotes sets of input/output units mounted in slots on the interface boards of the personal computer 20 on the server side, and 50 denotes a remote PC (personal computer) connected to the system through the Internet.

Figure 2:
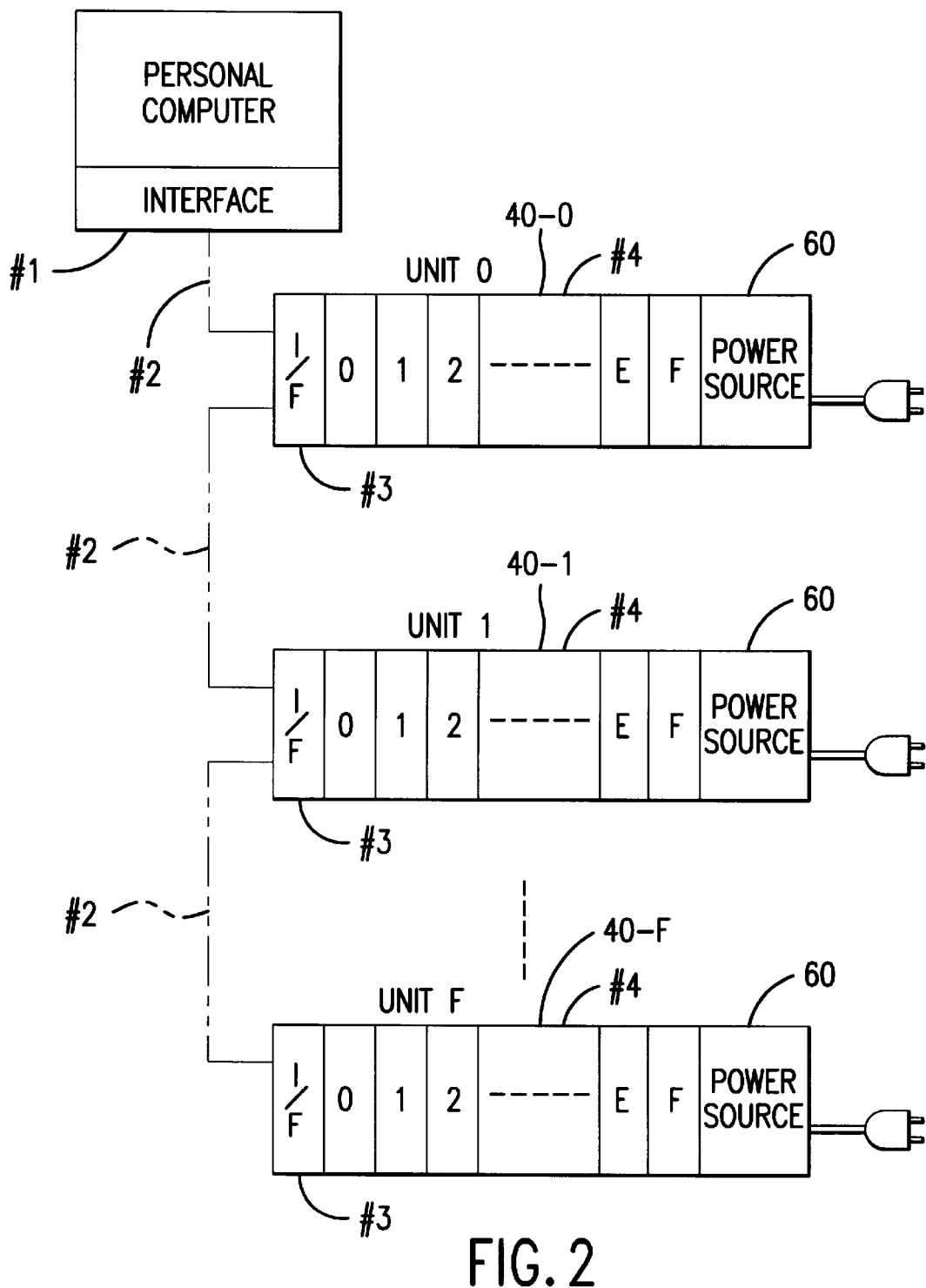
FIG. 2 is a block diagram showing the state of connections between input-output units in the embodiment of the invention.

In each of the input/output units 40-0 - 40-3,..., there are provided, as shown in FIG. 2, an interface board I/F, slots 0 - F, and a power source 60 which is independent of the personal computer. In slots 0 - F, there are inserted single-function input/output devices 70 such as a motor 70-1, a display 70-2, an alarm lamp 0-3, and a switch 70-4, in connection thereto.

In the present embodiment, a portion of an input-output interface #3 is set up as a virtual port independent of the personal computer port. This eliminates the need for compatibility with the hardware of the personal computer 20.

In this virtual port, designation of the input-output interface #3 is made by designating the unit, slot, and port.

In the configuration shown in FIG. 2, the port address for accessing port 2 of interface #1 is composed of unit l(interface #1), slot 1(interface of input output unit 40-1), and port 2 and, hence, it becomes 112h.

Likewise, when accessing interface #1, port 8 of interface of input output unit 40-2, the port address becomes 128h. Thus, any of the ports 000 - FFF can be accessed.

The procedure for constructing the input/output client/server system of the invention will be described below.

First, in the personal computer 20 on the server side, the input-output units connected thereto are registered in an OS such as Windows NT or Windows 95. This operation is performed by inserting the FD with the procedure for registration written therein in the FD drive unit and executing the setup program. The driver software in the above OS, upon receipt of an external request for accessing an input-output unit, only transmits the request to the designated inputoutput unit and makes a response to the request, while not accessing the input/output device within the personal computer. Therefore, the personal computer is safe in terms of its software.

The client side, in designating a port address through the software incorporated in the PC 10, can access any general purpose input/output device 70 of a general purpose apparatus in the network by designating the IP address and the port address. Namely, it transmits the following signals over the Ethernet or Internet.

For inputting - IP address, command, unit number, and slot number.

For outputting - IP address, command, unit number, slot number, and output data.

Here, the command is an instruction given to the input/output device 70. When outputting to the motor 70-1, its content is direction and quantity of movement, whereas when inputting therefrom, its content is a request for data of the current position. When outputting to the display 70-2, it is a request for output data on the display, and when outputting to the alarm lamp 70-3, it is an instruction to turn on and off the lamp according to information in the output data. When inputting from the switch 70-4, it is a request for supply of on/off information concerning the switch.

The input-output server 20 is constituted of the software and hardware incorporated in the general purpose apparatus and upon receipt of an input request from a client PC 10 designating the IP address thereof, it executes access to the general purpose device 70 and sends back the results to the client PC 10.

The client side PC 10 provides an access program for inputting/outputting in the OCX format of the WindowsTM.

The server side personal computer PC 20 operates as a Windows service.

Communications over the network are carried out by using the technology of the Windows-socket.

Here, the term "Windows-socket" m0eans a two-way inter-process communications method using the TCP/IP protocol system and the "socket" means a terminal point in the network connection. Two processes use the sockets ( ) and establish a network path between themselves by connecting the sockets produced by each.

While each of the units 40-0 - 40-F is provided with an independent power source 60 as shown in FIG. 2, the personal computer is capable of accessing access from its interface board #1, through the floating line #2, to the interfaces #3 of the input-output interface units, to thereby control a plurality of units #4 as electrically independent of one another.

Thus, loss of the power source of an input/output interface unit, or electrical trouble occurring therein, do not affect other input-output interface units or the personal computer.

Since the floating line #2 is formed of a floating TTL circuit (IC) and the like, and provided with a floating ground, the input-output unit and the personal computer are kept electrically independent of each other. Therefore, even if power of the input-output unit is cut off or an electrical fault is produced in the input-output unit while power is applied to the personal computer, no adverse effect is produced on the personal computer or other input-output units. This is an essential factor for the invention employing general purpose devices.

According to the invention, development of application software for realizing access to input/output devices across networks by utilizing the input/output client/server system can be attained on the client side by only designating the IP address and the port address for invoking the desired software.

Therefore, even when there are a plurality of server sides, only the client side is required to designate the IP address. Further, a plurality of client sides can make access from their application to one server side. Further, when specifications are changed, they can be adopted by simply changing the application software on the client side.

In this way, the efficiency in software development can be greatly enhanced.

What is claimed is:

1. An input/output client/server system in a remote control system between general purpose apparatuses provided with communications functions across networks complying with TCP/IP protocol comprising:

at least one general purpose apparatus;

at least one interface;

at least one general purpose input/output unit mounted on the at least one interface board and provided with a function to give a predetermined response to a command transmitted thereto from the at least one general purpose apparatus on a transmitter side;

said at least one interface recognizing addresses of said general purpose input/output units provided on said general purpose apparatus on the receiver side; and means for transmitting a command to said general purpose input/output unit by using an IP address of the general purpose apparatus at the destination, an address of said at least one interface and a physical port address of the general purpose input/output unit connected to said general purpose apparatus on the transmitter side.

2. An input/output client/server system according to claim 1, wherein said network is a Local Area Network (LAN).

3. An input/output client/server system according to claim 1, wherein said network is an Internet.

4. An input/output client/server system according to claim 1, wherein a power source of said general purpose apparatus on the receiver side and a power source of said at least one general purpose input/output unit are independent of one another, and wherein signal lines between said general purpose apparatus on the receiver side and said general purpose input/output units are formed of floating-ground floating lines.

* * * * *